Sept. 19, 1933.  R. W. HAMBRICK  1,927,606
DRAFT CONTROL APPARATUS
Filed Feb. 3, 1933  2 Sheets-Sheet 1

Inventor
R. W. Hambrick
By Felix A. Russell
Attorney

Sept. 19, 1933.  R. W. HAMBRICK  1,927,606
DRAFT CONTROL APPARATUS
Filed Feb. 3, 1933  2 Sheets-Sheet 2
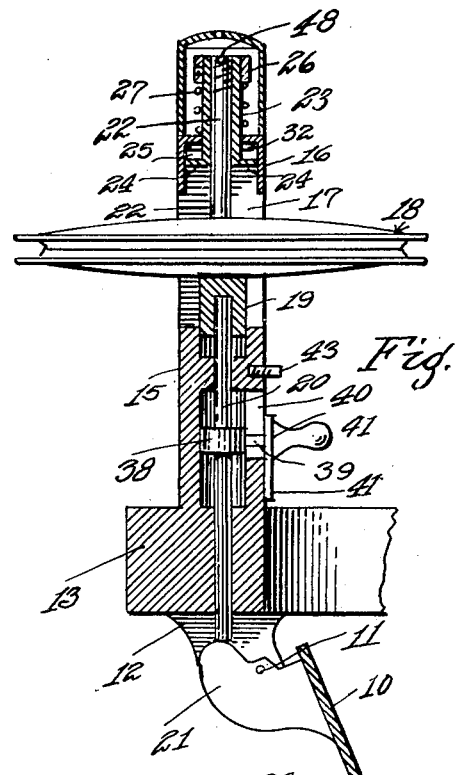
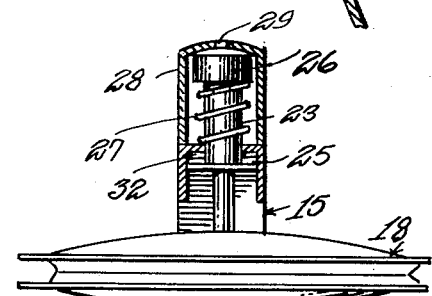
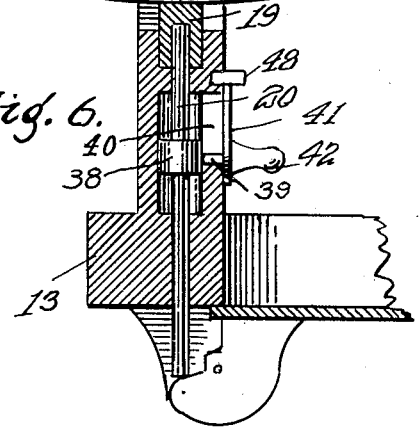
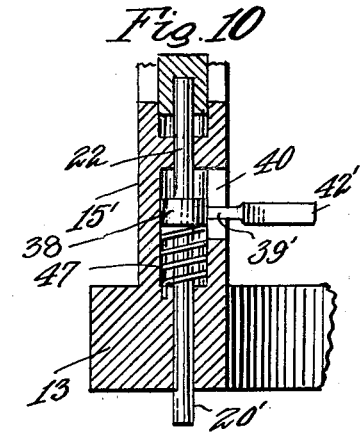
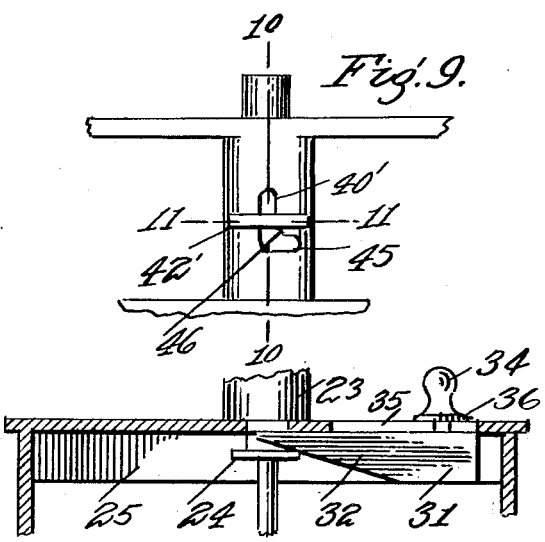
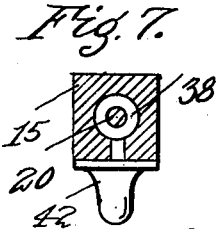
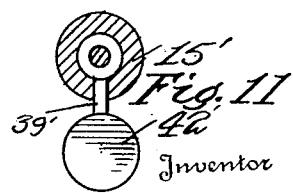

Patented Sept. 19, 1933

1,927,606

UNITED STATES PATENT OFFICE 1,927,606

DRAFT CONTROL APPARATUS

Raleigh W. Hambrick, Skippers, Va.

Application February 3, 1933. Serial No. 655,131

4 Claims. (Cl. 236—95)

The present invention relates to new and useful improvements in devices for controlling drafts in stoves, furnaces and the like and consists in the combinations, constructions and arrangements herein described and claimed.

An object of the invention is the provision of a compact thermostatically operated damper.

Another object of the invention is the provision of novel adjusting means for the controls utilized in the device.

A further object is the provision of a simple apparatus which may be definitely controlled both by manual operation and by means of an adjustable thermostatic control.

Another object of the invention is the provision of a device of this kind which is capable of low cost production.

A further object of the invention is the provision of a device of this kind which is adjustable to changes in atmospheric pressures which, as is well known, vary from day to day.

Other objects and advantages will appear in the following specification and the novel features of the device will be particularly pointed out in the appended claims.

Figures 1, 2:
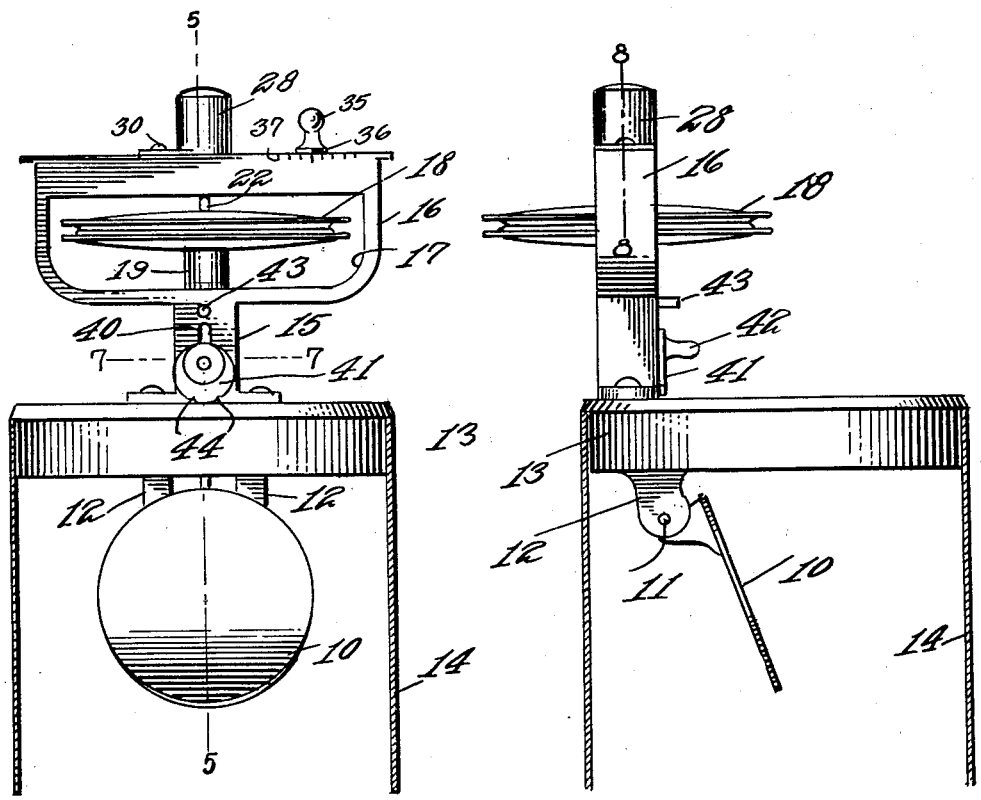
Figure 3:
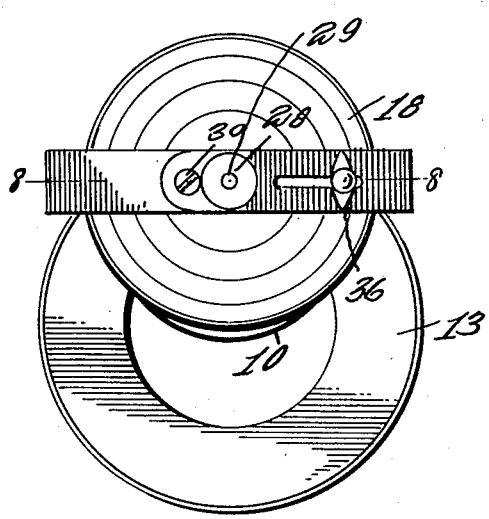
Figure 4:
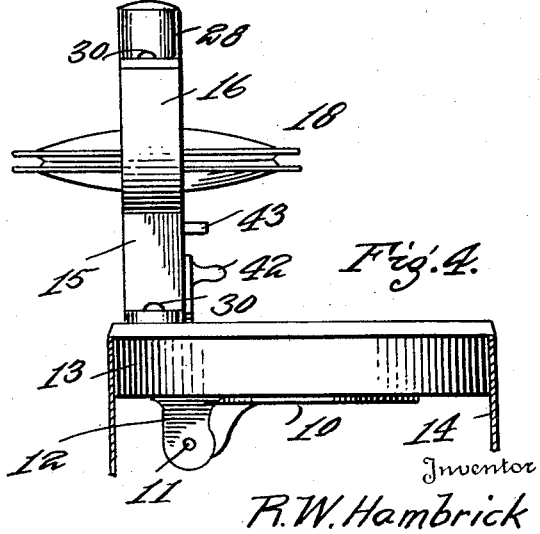

The invention is illustrated in the accompanying drawings, forming part of this application, in which Figure 1 is a front elevational view of the completely assembled device with the damper therein utilized in open position, Figure 2 is a side elevational view thereof, Figure 3 is a plan view thereof, Figure 4 is a view similar to that shown in Fig. 2, except that the damper is shown in closed position, Figure 5 is an enlarged sectional view taken along line 5—5 of Fig. 1, Figure 6 is an enlarged sectional view similar to that shown in Fig. 5, except that the damper is shown in closed position, Figure 7 is an enlarged horizontal sectional view taken substantially along line 7—7 of Fig. 1, Figure 8 is an enlarged sectional view taken substantially along line 8—8 of Fig. 2, Figure 9 is an enlarged elevational view in detail of a modification of part of the device as shown in Figures 1 to 8, inclusive, Figure 10 is a sectional view taken along line 10—10 of Fig. 9, and Figure 11 is a sectional view taken along line 11—11 of Fig. 9.

Referring more particularly to the drawings, there is shown therein a damper 10 pivotally mounted as shown at 11 to a bracket 12 carried by an annular seat 13 which is adapted to be mounted in a draft inlet pipe 14.

Mounted upon the seat 13 is a housing 15 having at its upper end a frame 16 having a substantially rectangular opening 17 therein. Within this opening 17 is mounted a thermo-responsive element 18 carrying centrally on its under side a socket 19 for the reception of a shaft 20. The shaft 20 is slidably mounted in the housing 15 and its lower end bears against a cam lever 21 which is preferably made integral with the damper 10. The upper side of the element 18 bears against a pin 22 which is threaded into a sleeve 23 slidably mounted in and projecting through the top portion of the frame 16 and is formed with a pair of arms 24 adapted to be positioned in an opening 25 in the under side of the top portion of the frame and having a collar 26 permanently affixed to its upper end.

A tension spring 27 surrounds the sleeve 23 and bears against the top side of the top portion of the frame 16 and the under side of the collar 26. A housing 28 overlies the sleeve 23 and spring 27 and is provided with an opening 29 in its upper portion and is removably attached to the frame by means of a screw 30. A slot 48 is provided in the top of the shaft or pin 22 for adjusting the same within the sleeve 23.

Mounted in the slot 25 is a block 31 having a pair of wedge shaped arms 32 which engage the arms 24 of the sleeve 23. The block is provided with an operating handle 34 which projects through a slot 35 in the frame 16 and carries an indicating pointer adapted to register with graduations 37 cut into the frame 16. Mounted on the shaft 20 within the housing 15 is a collar 38 which carries a pin 39 projecting through a slot 40 in the housing 15 and has revolubly mounted thereon a cam 41 preferably formed with an operating handle 42. A pin 43 is affixed to the housing 15 directly above the slot 40. The cam face is provided with a series of notches 44 for engagement with the pin 43.

In the modified form of the invention shown in Figs. 9 to 11, inclusive, the housing 15' which corresponds to the housing 15 shown in Figs. 1 to 8, inclusive, is made circular instead of square in cross section and has projecting through a bayonet slot 40' a pin 39' provided with an operating handle 42'. The offset portion 45 of the bayonet slot 40' is provided with a notch 46. A spring 47 is suitably mounted around the shaft 20' and is adapted to urge the shaft in the direction of the offset portion 45 of the bayonet slot 40'.

In the operation of the device, the damper 10 is set in a given position by moving the handle 35 which causes the arms to raise or lower the shaft 20 through the medium of the arms 24 carried by the sleeve 23, the pin 22, the element 18 and the socket 19. The shaft causes the movement of the damper by pressure against the cam lever 21 which in turn moves the damper 10.

This positioning is indicated on the graduations 37 by means of the pointer 36. A finer adjustment is provided by turning the pin 22 in the threaded opening in the sleeve 23.

The thermoresponsive element 18, then, by means of its expansion and contraction, causes the opening and closing of the damper 10. The damper may also be placed in various positions by turning the cam 41 until one of the notches 44 engage the pin 43, or in the modified form shown in Figs. 9 to 11, inclusive, by moving the pin 39' downwardly until it engages in the offset portion 45 of the bayonet slot 40' or into the notch 46 thereof.

While but two forms of the invention have been shown and described herein, it will be apparent to those skilled in the art that the invention is not so limited that various minor modifications may not be made therein without departing from the spirit of the invention or the scope of the appended claims.

What is claimed is:

1. In a thermosensitive damper control, a pivoted damper, a seat for the damper, a lever attached to the damper, a frame mounted on the seat, a shaft bearing against the lever, slidably mounted in the frame and carrying at its other end a temperature responsive element, a pair of adjusting means for the shaft and a manually operated latch for the shaft consisting of a pin attached to the shaft and projecting through a slot in the frame, a detent mounted on the frame, a cam revolubly mounted on the pin and having its face bearing against the detent and having notches cut therein for engagement with the detent and an operating handle for the cam.

2. In a thermosensitive damper control, a pivoted damper, a seat for the damper, a lever attached to the damper, a frame mounted on the seat, a shaft bearing against the lever, slidably mounted in the frame and carrying at its other end a temperature responsive element, a pair of adjusting means for the shaft and a manually operated latch for the shaft consisting of a pin attached to the shaft and projecting through a bayonet slot in the frame, a spring for maintaining the pin in the offset portion of the bayonet slot and an operating handle for the pin.

3. In a thermosensitive damper control, a damper, a frame, a thermosensitive element for actuating the damper, means for adjusting the position of the element consisting of a sleeve slidably mounted in the frame and carrying a pair of arms, a pin threaded in the sleeve and bearing against the element, a wedge slidably mounted in the frame at right angles to the pin and bearing against the arms carried by the sleeve and having an actuating handle projecting through the frame.

4. In a thermosensitive damper control, a pivoted damper, a seat for the damper, a lever attached to the damper, a frame mounted on the seat, a shaft bearing against the lever, slidably mounted in the frame and carrying at its other end a temperature responsive element, a pair of adjusting means for the shaft and a manually operated latch for the shaft consisting of a pin attached to the shaft and projecting through an opening in the frame and having means for engagement with the frame whereby the shaft may be retained in a predetermined position.

RALEIGH W. HAMBRICK.